(12) United States Patent
Tome

(10) Patent No.: US 9,367,613 B1
(45) Date of Patent: Jun. 14, 2016

(54) SONG IDENTIFICATION TRIGGER

(71) Applicant: Google Inc., Mountain View, CA (US)

(72) Inventor: Basheer Tome, Mountain View, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 14/168,081

(22) Filed: Jan. 30, 2014

(51) Int. Cl.
  *G06F 3/16* (2006.01)
  *G06F 17/30* (2006.01)

(52) U.S. Cl.
  CPC ............ *G06F 17/30758* (2013.01); *G06F 3/16* (2013.01)

(58) Field of Classification Search
  CPC ....... G10L 15/22; G10L 15/265; G10L 17/26; G10L 13/043; G10L 19/00; G06F 3/16; G06T 7/00
  USPC .......................... 704/270; 345/7–9; 455/550.1
  See application file for complete search history.

(56) References Cited

U.S. PATENT DOCUMENTS

| | | | |
|---|---|---|---|
| 7,444,353 B1* | 10/2008 | Chen et al. | |
| 7,698,238 B2 | 4/2010 | Barletta et al. | |
| 8,223,088 B1* | 7/2012 | Gomez et al. | 345/7 |
| 9,223,902 B1* | 12/2015 | McHugh | G06F 17/30967 |
| 2002/0143242 A1* | 10/2002 | Nemirovski | 600/300 |
| 2007/0014536 A1* | 1/2007 | Hellman | 386/94 |
| 2010/0211693 A1* | 8/2010 | Master et al. | 709/238 |
| 2011/0273455 A1* | 11/2011 | Powar | G06F 17/30769 345/473 |
| 2012/0117044 A1* | 5/2012 | Park | G06Q 10/101 707/706 |
| 2013/0150117 A1 | 6/2013 | Rodriguez et al. | |
| 2013/0268955 A1* | 10/2013 | Conrad | H04N 21/252 725/12 |

OTHER PUBLICATIONS

Desalvo et al., "Augmented Reality Head Mounted Display for Viewing Closed Captioned and/or Subtitled Streams", Sony Electronics, Inc., IPCOM000207866 (Jun. 15, 2011).

* cited by examiner

*Primary Examiner* — Eric Yen
(74) *Attorney, Agent, or Firm* — McDonnell Boehnen Hulbert & Berghoff LLP

(57) ABSTRACT

The present disclosure provides a wearable computing device. The wearable computing device may include a control system configured to perform functions. The functions may include receiving sensor data from one or more sensors of the wearable computing device. The functions may also include determining whether the sensor data is indicative of humming, singing, or whistling by a wearer. The functions may also include causing the wearable computing device to perform a content recognition of audio content in an ambient environment of the wearable computing device in response to the sensor data being indicative of humming, singing, or whistling by the wearer.

23 Claims, 10 Drawing Sheets

SONG IDENTIFICATION TRIGGER

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A wearable computing device, such as a head-mountable device (HMD) as an example, may be configured to identify songs playing in the environment of a wearer of the HMD. However, listening to, uploading, processing, and then displaying a list of all songs the wearer hears throughout their day requires a large amount of processing power. In addition, these data-processing-heavy algorithms may drain the battery of the HMD. Further, the wearer may not want a complete list of all songs played in their environment throughout the day. For example, if a wearer visits a location with music playing, a complete list of all songs played during their time at the location may be more information than the wearer desires. The wearer may only want to identify the songs that they enjoy, for example. Therefore, a system and method for selectively running a song identification algorithm may be desirable.

In one embodiment, the present disclosure provides a wearable computing device. The wearable computing device may include a control system configured to perform functions. The functions may include receiving sensor data from one or more sensors of the wearable computing device. The functions may also include determining whether the sensor data is indicative of humming, singing, or whistling by a wearer for a given time period, wherein the humming, singing, or whistling varies over the given time period. The functions may also include causing the wearable computing device to perform a content recognition of audio content in an ambient environment of the wearable computing device in response to the sensor data being indicative of humming, singing, or whistling by the wearer.

In another embodiment, the present disclosure provides a computer-implemented method. The method may include receiving sensor data from one or more sensors of the wearable computing device. The method may also include determining whether the sensor data is indicative of humming, singing, or whistling by a wearer for a given time period, wherein the humming, singing, or whistling varies over the given time period. The method may also include causing the wearable computing device to perform a content recognition of audio content in an ambient environment of the wearable computing device in response to the sensor data being indicative of humming, singing, or whistling by the wearer.

In another embodiment, the present disclosure provides a non-transitory computer readable medium having stored therein instructions executable by one or more processors of a head-mountable device to cause the head-mountable device to perform functions. The functions may include receiving sensor data from one or more sensors of the head-mountable device. The functions may also include determining whether the sensor data is indicative of humming, singing, or whistling by a wearer for a given time period, wherein the humming, singing, or whistling varies over the given time period. The functions may also include causing the head-mountable device to perform a content recognition of audio content in an ambient environment of the head-mountable device in response to the sensor data being indicative of humming, singing, or whistling by the wearer.

In yet another embodiment, a wearable computing device may include means for receiving sensor data from one or more sensors of the wearable computing device. The system may also include a means for determining whether the sensor data is indicative of humming, singing, or whistling by a wearer for a given time period, wherein the humming, singing, or whistling varies over the given time period. The system may also include a means for causing the wearable computing device to perform a content recognition of audio content in an ambient environment of the wearable computing device in response to the sensor data being indicative of humming, singing, or whistling by the wearer.

These as well as other aspects, advantages, and alternatives will become apparent to those of ordinary skill in the art by reading the following detailed description, with reference where appropriate to the accompanying drawings.

DETAILED DESCRIPTION

Figure 1A:
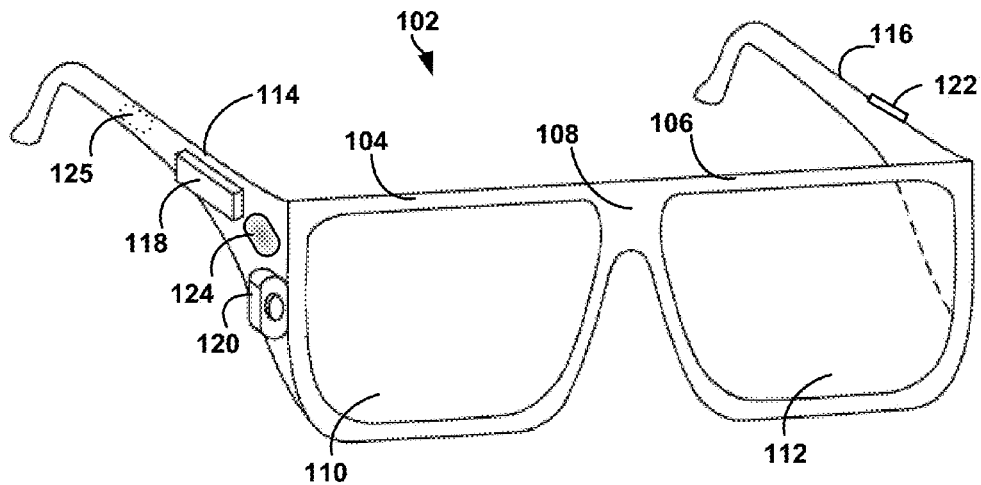
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

A wearable computing device, such as a head-mountable device (HMD) as an example, may be configured to identify songs playing in the environment of a wearer of the HMD. However, listening to, uploading, processing, and then displaying a list of all songs the wearer hears throughout their day requires a large amount of processing power. In addition, these data-processing-heavy algorithms may drain the battery of the HMD. Further, the wearer may not want a complete list of all songs played in their environment throughout the day. For example, if a wearer visits a location with music playing, a complete list of all songs played during their time at the location may be more information that the wearer desires. The wearer may only want to identify the songs that they enjoy, for example. Therefore, a system and method for selectively triggering a song identification algorithm may be desirable.

Using one or more sensors located on the HMD, the HMD may detect one or more signals indicating a wearer of the HMD enjoys a particular song playing in the ambient environment of the HMD. In one example, the signal indicating the wearer enjoys a song including detecting when the wearer is humming along to the song. In another example, the signal indicating that the wearer is whistling or singing along to the song. Other signals may include detecting when the wearer is nodding and/or tapping their feet, and when the wearer is dancing along to the song. When the HMD detects one or more of the signals indicating the wearer enjoys the song playing in the ambient environment of the HMD, the HMD may initiate a song identification algorithm. Songs identified may be stored in the HMD for future reference by the wearer. In another example, the HMD may display information indicative of the identified song, such as the song title, the genre of the song, the artist, and the album title. Further, the HMD may display an option for the wearer to purchase the identified song from a digital media library.

It should be understood that the above examples are provided for illustrative purposes, and should not be construed as limiting. As such, the method may additionally or alternatively includes other features or includes fewer features, without departing from the scope of the invention.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
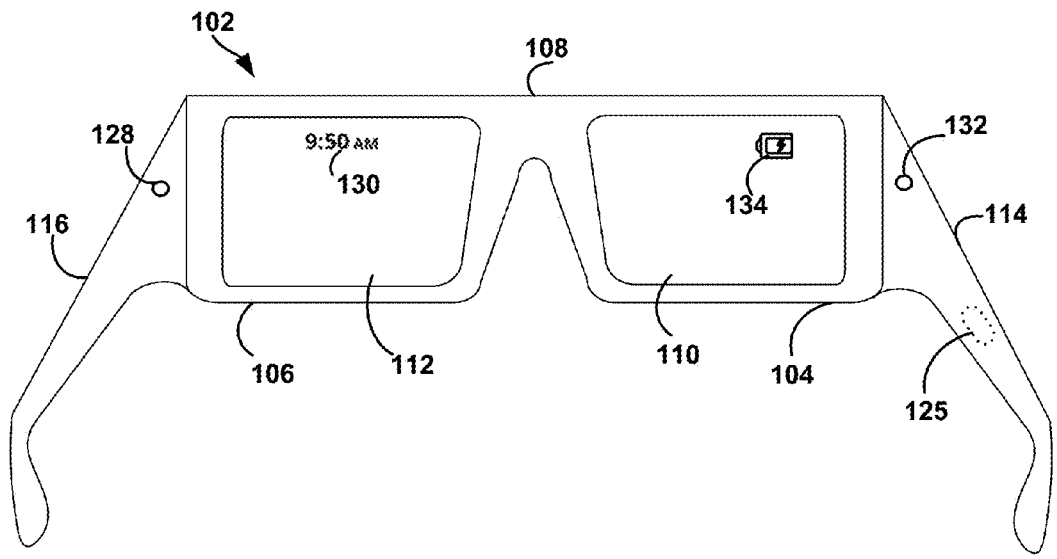
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
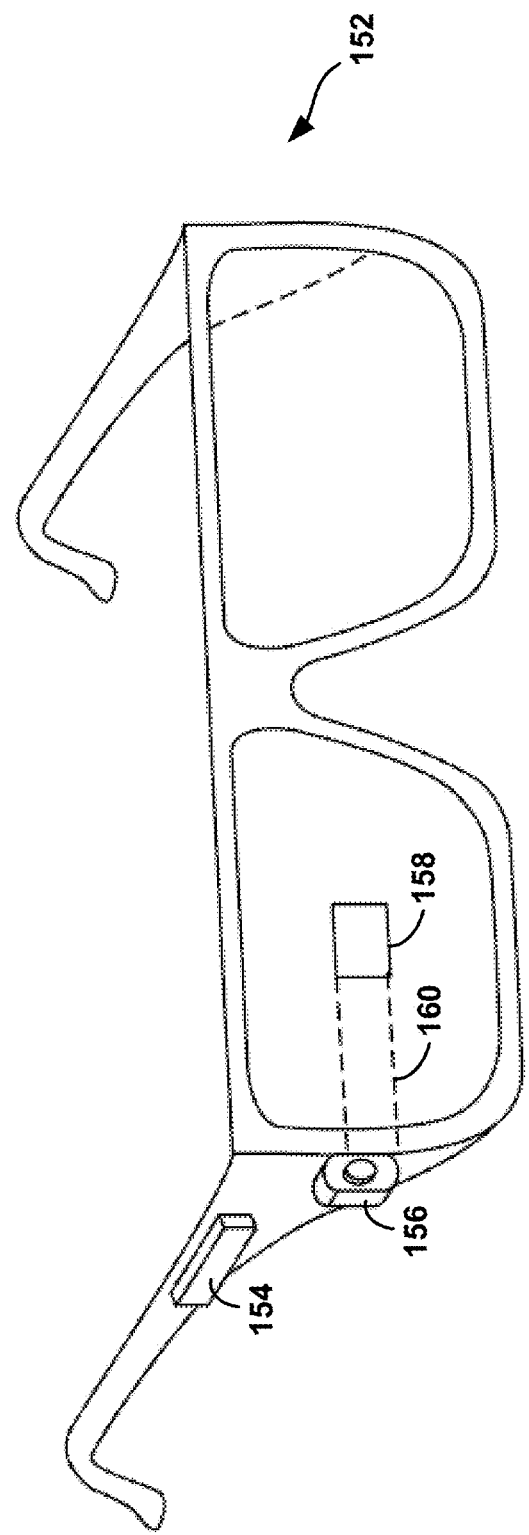
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
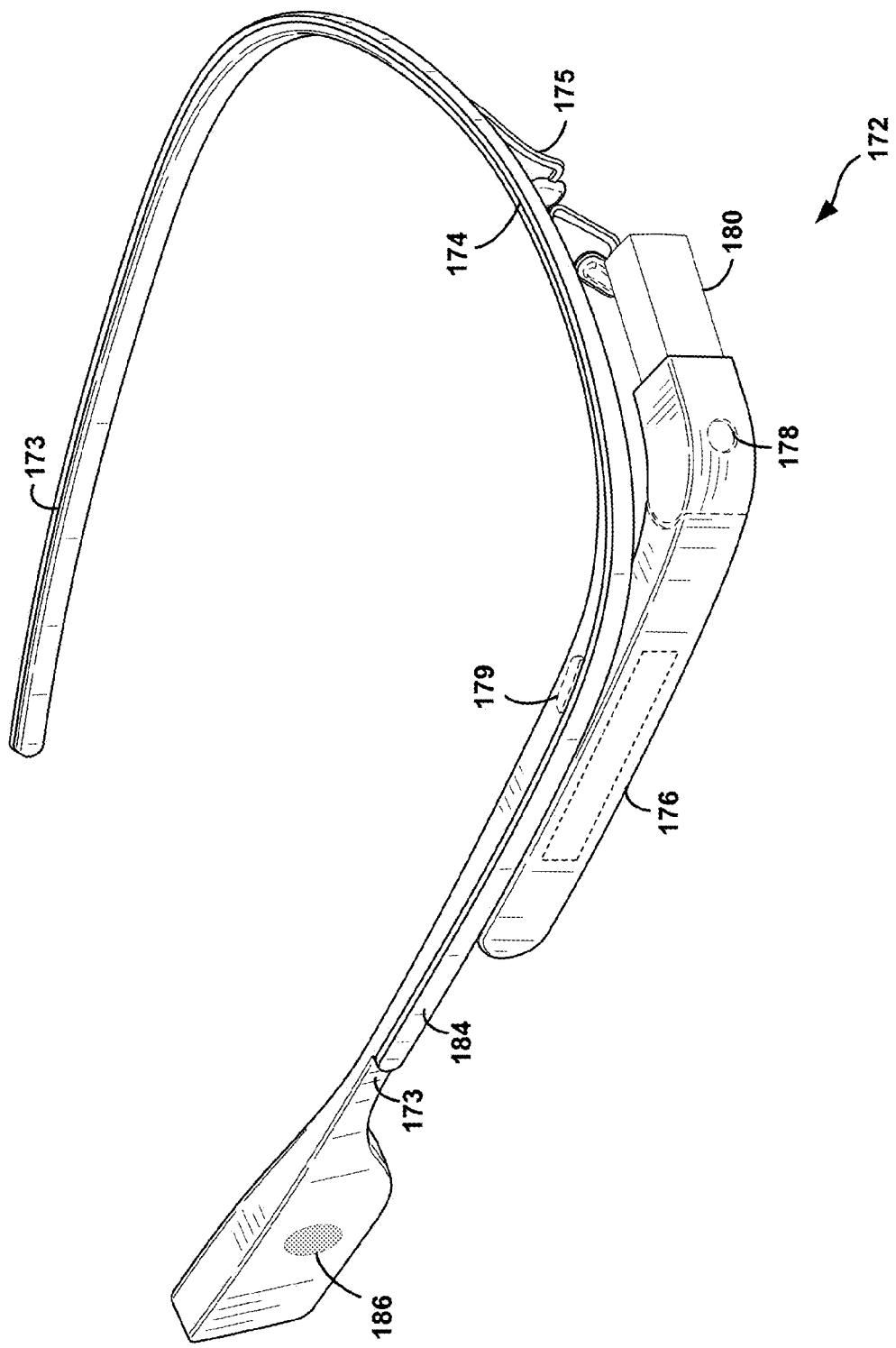
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
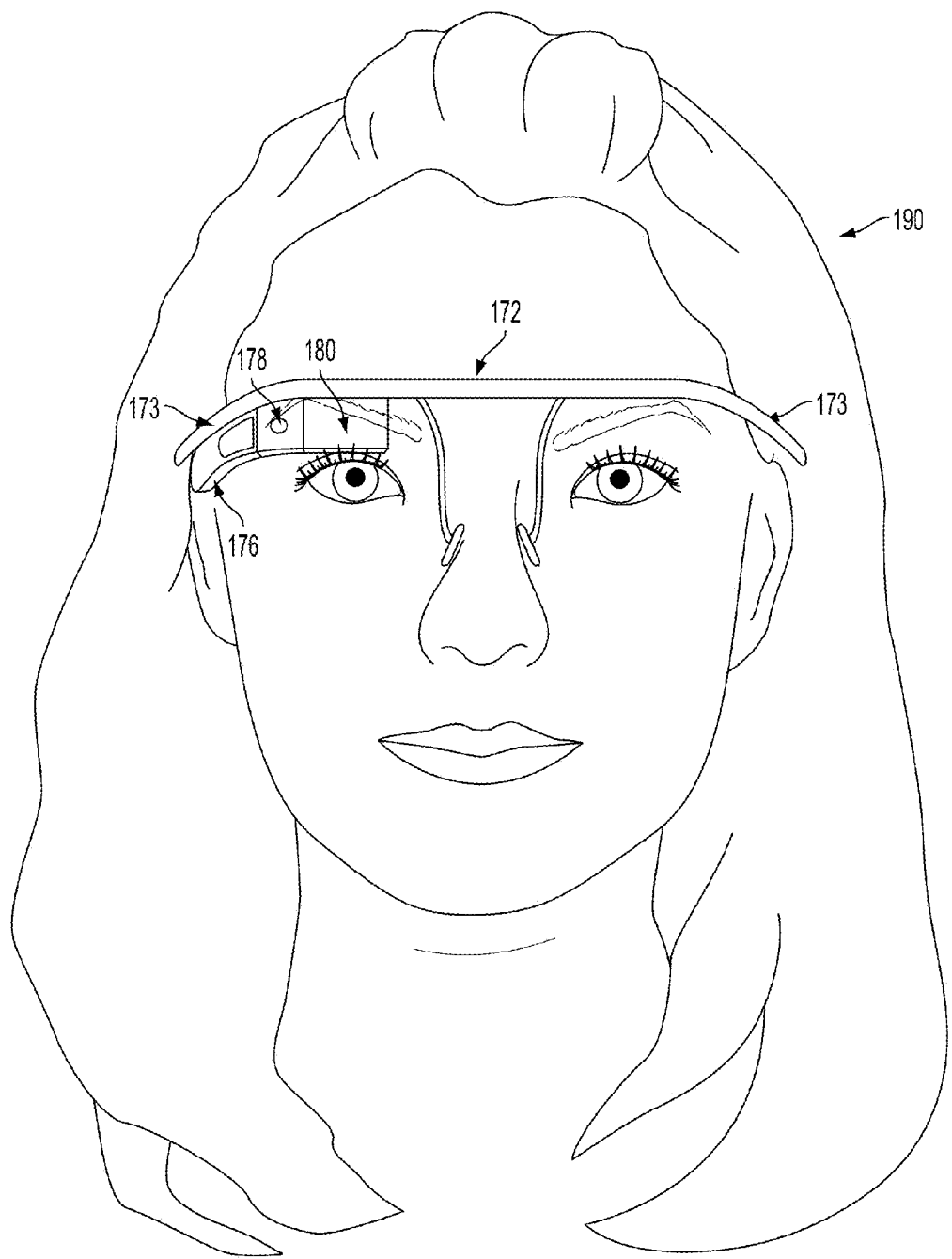
FIGS. 1E to 1G are simplified illustrations of the wearable computing system shown in FIG. 1D, being worn by a wearer.
Figure 1F:
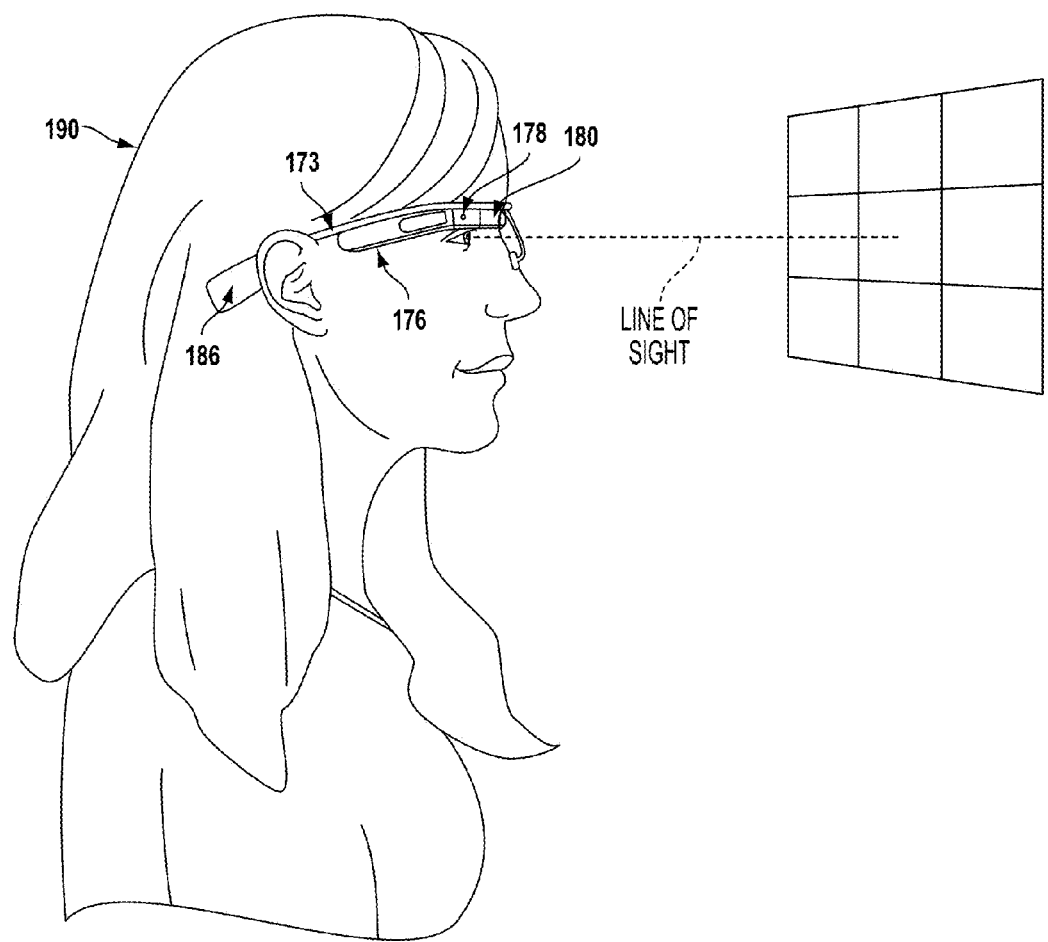
Figure 1G:
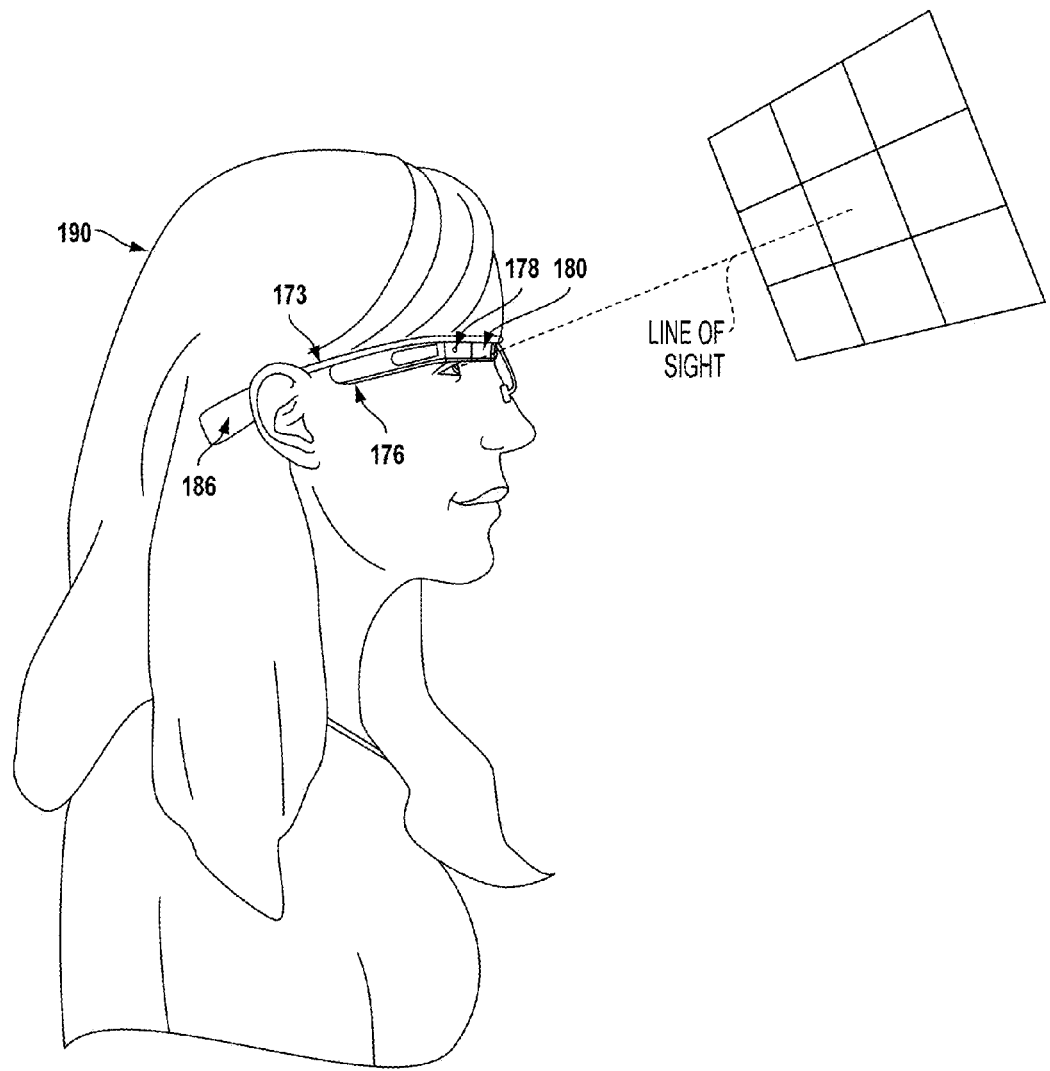

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
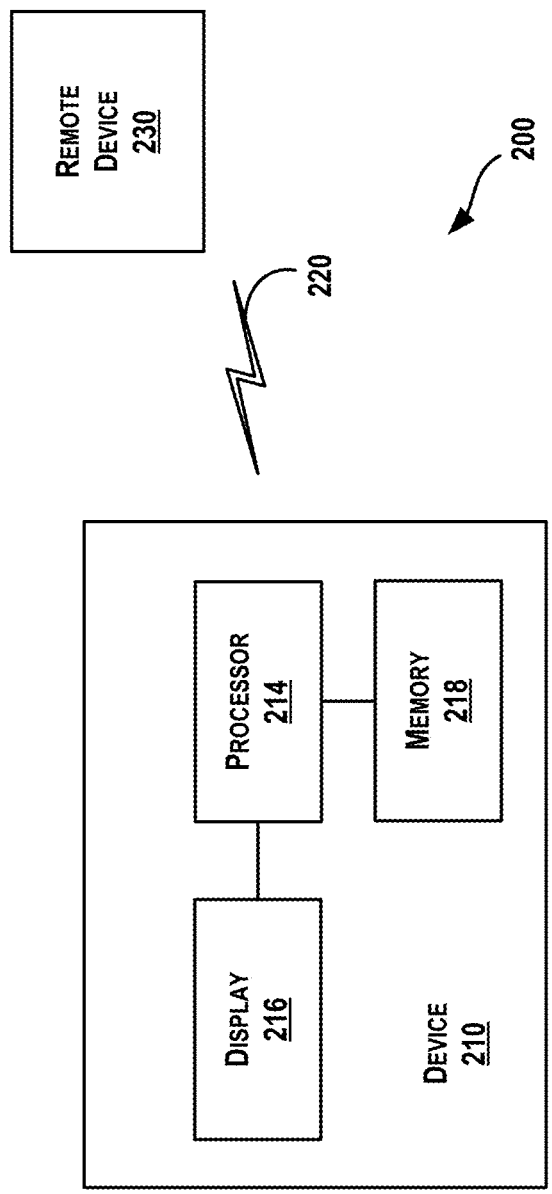
FIG. 2 is a simplified block diagram of a computing device according to an example embodiment.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. EXAMPLE METHODS

Figure 3:
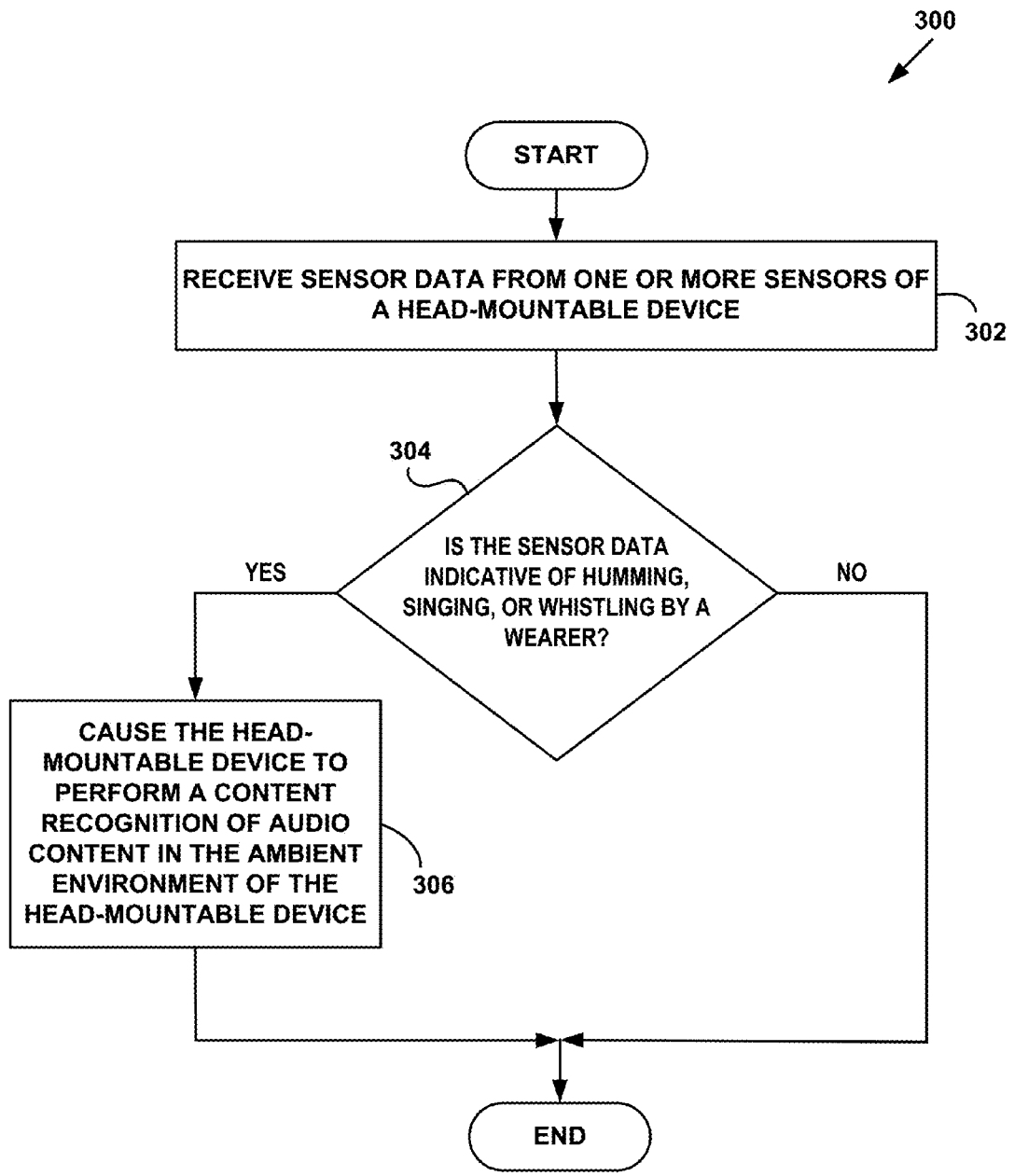
FIG. 3 is a flowchart of a method, according to an example embodiment.

FIG. 3 depicts a flowchart of an example method 300. Method 300 may include one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

Referring again to FIG. 3, method 300 involves a computing device. In one example, the computing device may be implemented as part of a wearable device, such as an HMD or component thereof. In another example, the computing device may be a separate entity in wireless communication with an HMD. At block 302, the method 300 includes receiving sensor data from one or more sensors of an HMD. The one or more sensors of the HMD may include one or more proximity sensors, one or more image-capture devices, one or more microphones, one or more accelerometers, one or more gyroscopes, and/or one or more magnetometers. Other sensing devices may be included in addition or in the alternative to the sensors that are specifically identified herein.

The one or more sensors may be integral to or separate from the HMD. For example, the one or more sensors may be integrated on the HMD, or may be remote to the HMD (such as biometric sensors placed on other portions of the body or in communication with the body). The one or more sensors may also be provided on a computing device remote from the HMD (such as a remote device such as a smartphone having location tracking and internet capabilities). The one or more sensors are configured to capture various data of the wearer of the HMD and send the sensor data to the computing device for further analysis. The computing device may be implemented as part of the HMD, or may be a separate entity in wireless communication with an HMD, as discussed above.

In one example, the one or more sensors of the HMD may include one or more microphones. In particular, the one or more microphones may include one or more bone conduction microphones. Referring to FIG. 1D, an example bone conduction microphone may be positioned on the nosepiece 175 of the HMD 172. Other locations are possible as well. The bone conduction microphone may be configured to detect vibrations from the body of the wearer, and consequently deliver audio data including the vibration data to the processor of the HMD.

The method 300 continues at block 304 with determining whether the sensor data is indicative of humming, singing, or whistling by the wearer. In one example, the HMD may include a "humming profile," a "singing profile" and a "whistling profile" stored in its data storage. In another example, the humming profile, singing profile, and/or whistling profile may be stored in a computing device separate from the HMD. The humming profile, singing profile, and/or whistling profile may be predetermined and stored in the data storage of the HMD, or the humming profile, singing profile, and/or whistling profile may be "learned" by the HMD during a training period to more accurately track a wearer's particular hum, sing, or whistle.

The humming profile, singing profile, and whistling profile include sensor data indicative of a typical hum or whistle, respectively. More particularly, an example humming profile may include audio data from the one or more microphones of the HMD corresponding to a typical hum of a wearer of the HMD. As an example, the humming profile may include audio data having a varying frequency over a given time period. In one example, the frequency of the hum may vary between frequencies in the range of approximately 125-250

Hz, although other frequencies are possible. Further, the given time period may be five seconds, although other time periods are possible as well. In such an example, the humming profile may describe one or more transitions between various notes having frequencies between 125 Hz and 250 Hz over a five second time period. In another example, the humming profile may require a minimum of three transitions between different frequencies between 125 Hz and 250 Hz over a five second time period. Other specific examples are possible as well.

Further, if the one or more microphones of the HMD are bone conduction microphones, the humming profile may include vibration data typical of a hum from a wearer of the HMD. Other sensor data is possible as well. The HMD may be configured to compare the received sensor data to the humming profile. If the differences between the received sensor data and the humming profile are below a threshold value, the HMD may determine that the received sensor data is indicative of humming by the wearer.

Similarly, an example whistling profile may include audio data from the one or more microphones of the HMD corresponding to a typical whistle of a wearer of the HMD. As an example, the whistling profile may include audio data having a varying frequency over a given time period. In one example, the frequency of the whistle may vary between frequencies in the range of approximately 500-5,000 Hz, although other frequencies are possible. The whistling profile may describe one or more transitions between various notes having frequencies between 500 Hz and 5,000 Hz over a five second time period, as an example. In another example, the humming profile may require a minimum of three transitions between different frequencies between 500 Hz and 5,000 Hz over a five second time period. Other specific examples are possible as well. Further, if the one or more microphones of the HMD are bone conduction microphones, the whistling profile may include vibration data typical of a whistle from a wearer of the HMD. Other sensor data is possible as well. The HMD may be configured to compare the received sensor data to the whistling profile. If the differences between the received sensor data and the whistling profile are below a threshold value, the HMD may determine that the received sensor data is indicative of whistling by the wearer.

An example singing profile may include audio data from the one or more microphones of the HMD corresponding to a typical singing of a wearer of the HMD. As an example, the singing profile may include audio data having a varying frequency over a given time period, as discussed above.

In another example, the HMD may further determine whether the sensor data is indicative of a nodding head of the wearer of the HMD. The HMD may include a "nodding profile" stored in its data storage. In another example, the nodding profile may be stored in a computing device separate from the HMD. The nodding profile includes sensor data indicative of a typical wearer response to nodding.

More particularly, an example nodding profile may include acceleration data from the one or more accelerometers of the HMD corresponding to a typical nodding of a wearer of the HMD. The acceleration data may be a series of spikes in acceleration data over a short time period, such as 1 second. As a specific example, the nodding profile may include at least three occurrences of an acceleration data spike to a range of acceleration from 20 m/s$^2$ to 30 m/s$^2$ over a 5 second time period. In one example, the wearer may be still at the time of the head nodding, so the acceleration will increase from 0 m/s$^2$ to an acceleration in the range of 20 m/s$^2$ to 30 m/s$^2$. In another example, the wearer may be moving at the time of the head nodding, meaning the HMD will have a non-zero original acceleration. In such a case, the HMD will experience a change in acceleration from to the original acceleration value to 20 m/s$^2$ to 30 m/s$^2$ greater than the original acceleration. Other examples are possible as well. The HMD may be configured to compare the received sensor data to the nodding profile. If the differences between the received sensor data and the humming profile are below a threshold value, the HMD may determine that the received sensor data is indicative of nodding by the wearer.

The method 300 continues at block 306 with causing the HMD to perform a content recognition of audio content in an ambient environment of the HMD in response to the sensor data being indicative of humming, singing, or whistling by the wearer. In another example, the HMD may perform the content recognition of a song in an ambient environment of the HMD in response to the sensor data being indicative of nodding by the wearer. In yet another example, the HMD may perform the content recognition of a song in an ambient environment of the HMD in response to the sensor data being indicative of a combination of two or more of nodding, humming, singing and whistling by the wearer.

In one example, the HMD may be configured to initiate a song identification application stored on the HMD to perform the content recognition of the audio content in the ambient environment of the HMD. The HMD may perform the content recognition of the audio content by recording a portion of the audio content of the ambient environment of the HMD and seeking a match based on an audio fingerprint in a song database. The song database may be stored in an external server, as an example. The audio fingerprint may include a spectrogram, which is a visual representation of the spectrum of frequencies in a sound as they vary with time. The song database may include a catalog of audio fingerprints. The HMD may further perform the content recognition by recording audio content in the ambient environment, and sending the audio content to a content recognition server that is configured to identify any songs in the audio content and return information to the HMD indicating titles of the songs, etc.

In operation, the HMD may record a portion of audio content from the ambient environment in response to the sensor data being indicative of humming, singing, or whistling by the wearer. In one example, the recorded portion of the audio content from the ambient environment may be approximately 10 seconds, although other time periods are possible as well. The HMD may then create an audio fingerprint of the audio content from the ambient environment of the HMD, and compare the created audio fingerprint to the song database. If there is a match, information indicative of the song may be displayed to the wearer, as discussed below.

IV. ILLUSTRATIVE DEVICE FUNCTIONALITY

Figure 4A:
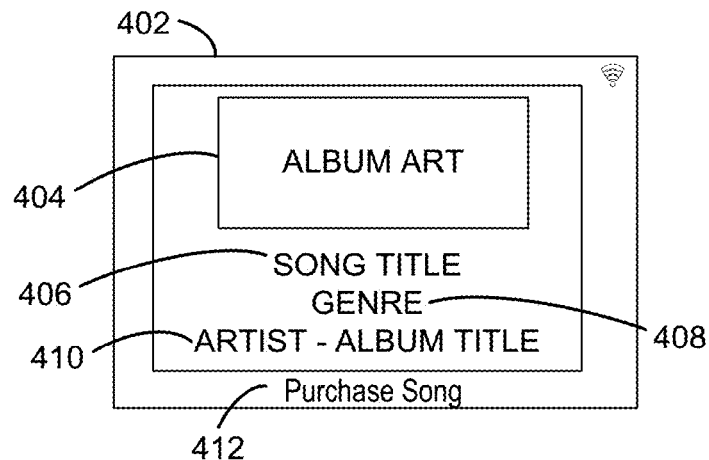
FIGS. 4A, 4B and 4C illustrate views of a user-interface, according to example embodiments.
Figure 4B:
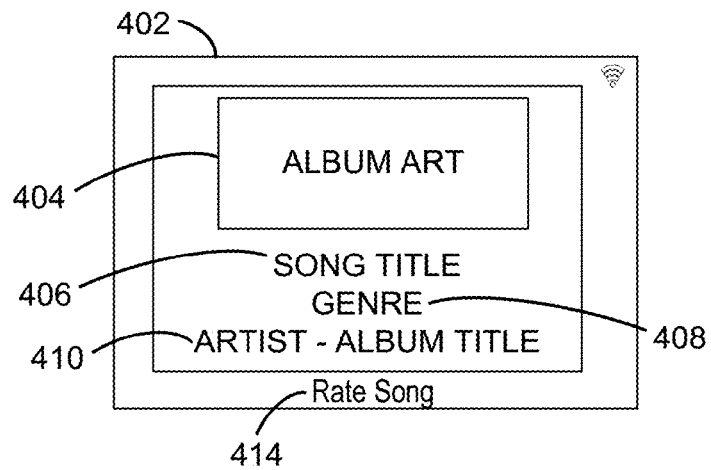
Figure 4C:
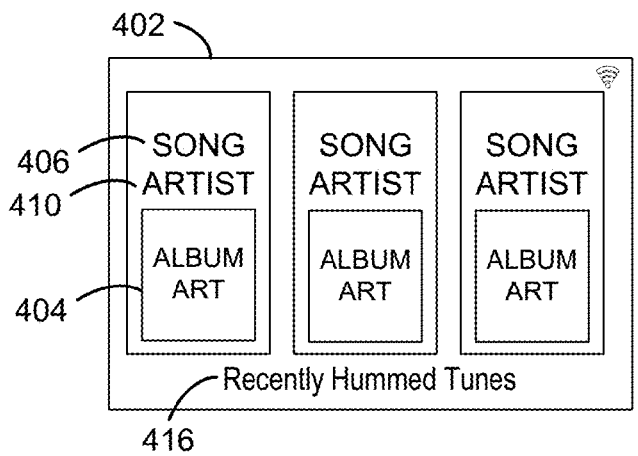

FIGS. 4A, 4B and 4C illustrate applications of a user-interface of an example HMD, according to example embodiments. In order to provide the various messages described herein, these applications may utilize methods such as those described above in reference to FIG. 3. However, other techniques may also be used to provide the user-interface functionality shown in FIGS. 4A, 4B, and 4C.

FIG. 4A shows an example display 402 of an HMD. The display 402 may be configured similar to display 158 shown in FIG. 1C, or display 180 shown in FIGS. 1D and 1E, discussed above. After the HMD performs the content recognition of audio content in the ambient environment of the HMD, the HMD may display information indicative of a song corresponding to the audio content. In one example, the information indicative of the song may include one or more of the album art 404, the song title 406, the genre 408, and the artist/album title 410. Further, the HMD may display an option to purchase the song identified by the content recognition. In one example, a wearer may select the option to purchase the song identified by the content recognition by selecting the "purchase song" icon 412 via a touchpad on the HMD, a button on the HMD, or though some other means. The HMD may be configured to connect the HMD to a virtual music library where the wearer can purchase the song identified by the content recognition. The purchased song may be stored locally on the HMD, or may be stored on another computing device.

FIG. 4B shows another example display 402 of the HMD. The display 402 illustrates the information indicative of the song identified by the content recognition, including the album art 404, the song title 406, the genre 408, and the artist/album title 410, as discussed above. In one example, when the song in the ambient environment of the HMD is identified, the HMD may determine whether the wearer owns the identified song. In one example, the identified song may already be stored locally on the HMD for playback by the wearer. In another example, the wearer identified song may be stored on a separate computing device associated with the wearer. The HMD may determine whether the wearer owns the identified song by comparing the identified song title to a list of song titles owned by the wearer. If the HMD determines that the wearer owns the identified song, the HMD may display an option to rate the song. By selecting the "Rate Song" icon 414, the wearer can rate the identified song, thereby organizing the music in the wearer's personal music library. If the HMD determines that the wearer does not own the identified song, the HMD may display the "Purchase Song" icon as discussed above in relation to FIG. 4A.

FIG. 4C shows yet another example display 402 of the HMD. The display 402 in FIG. 4C illustrates the three previously identified songs in the ambient environment of the HMD. Each of the previously identified songs may include the song title 406, the artist 410, and the album art 404, as an example. Further, the display 402 may include a caption, such as "Recently Hummed Tunes" 416. Other examples may include "Recently Whistled Tunes," "Recently Sung Tunes" or "Recently Identified Songs." The display 402 of FIG. 4C may be displayed after the displays of FIG. 4A or 4B. For example, immediately after the HMD identifies the song in the ambient environment of the HMD, the HMD may display the information indicative of that song, such as display 4A or 4B. Subsequently, the HMD may display a list of previously identified songs, as shown in FIG. 4C. Each of the previously identified songs may include an icon to enable the wearer to purchase and/or rate the previously identified songs, as discussed above.

V. EXAMPLE COMPUTER-READABLE MEDIUM CONFIGURED TO PERFORM A CONTENT RECOGNITION OF A SONG BASED ON DETECTION OF HUMMING, SINGING, OR WHISTLING

Figure 5:
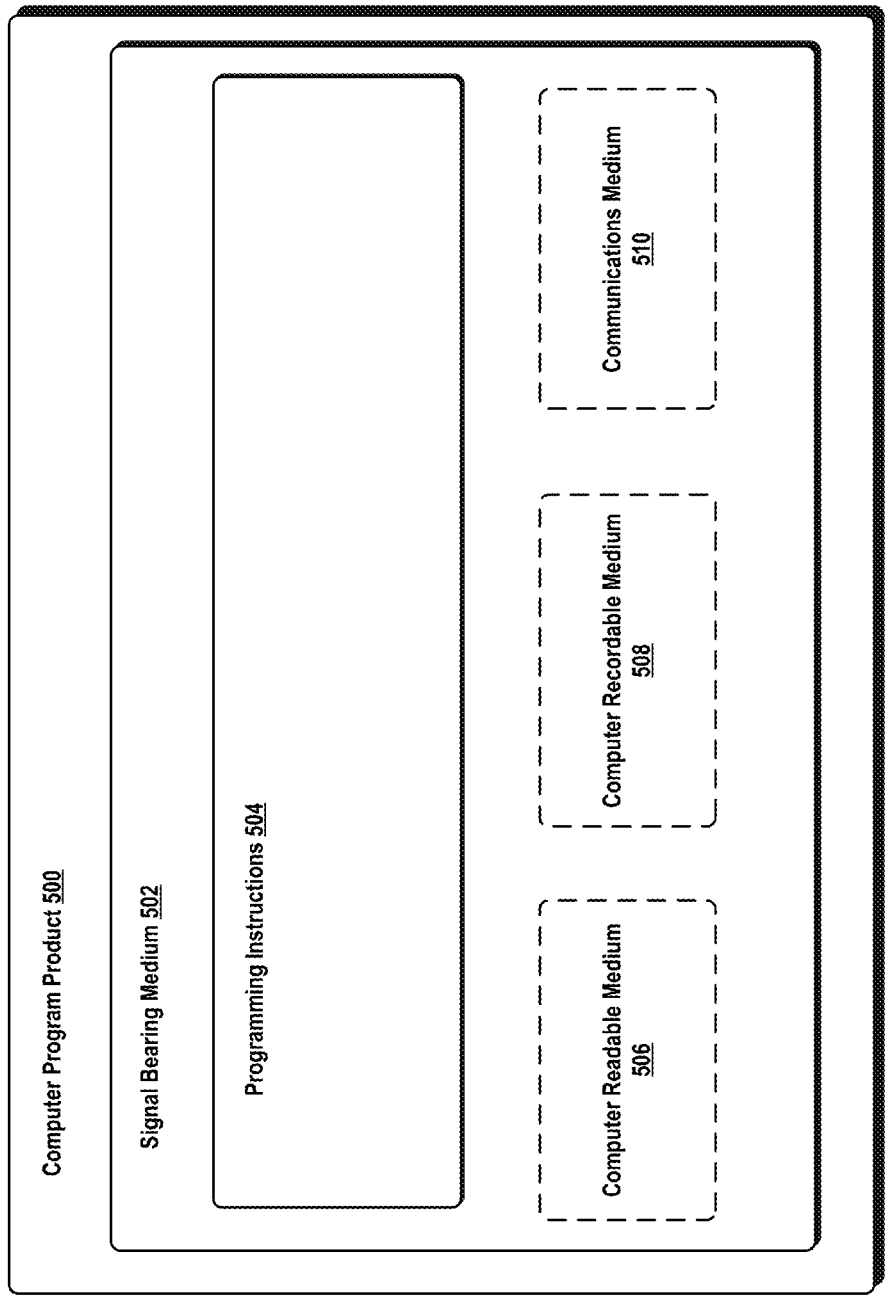
FIG. 5 depicts a computer-readable medium configured according to an example embodiment.

FIG. 5 illustrates a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4C. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device such as the processor 214 of FIG. 2 is configured to provide various operations, functions, or actions in response to the programming instructions 504 conveyed to the processor 214 by one or more of the computer-readable medium 506, the computer recordable medium 508, and/or the communications medium 510.

The non-transitory computer-readable medium could also be distributed among multiple data storage elements, which could be remotely located from each other. The device that executes some or all of the stored instructions could be a client-side computing device 210 as illustrated in FIG. 2. Alternatively, the device that executes some or all of the stored instructions could be a server-side computing device.

VI. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

I claim:

1. A wearable computing device comprising:
a control system configured to:
receive sensor data from one or more sensors of the wearable computing device;
determine whether the sensor data is indicative of humming by a wearer, indicative of singing by the wearer, or indicative of whistling by the wearer for a given time period, wherein the humming, singing, or whistling varies over the given time period such that the humming, singing, or whistling corresponds to at least a portion of a song in an ambient environment of the wearable computing device; and
in response to the sensor data being indicative of humming by the wearer, indicative of singing by the wearer, or indicative of whistling by the wearer, cause the wearable computing device to perform a content recognition on audio content in the ambient environment of the wearable computing device, wherein the audio content in the ambient environment of the wearable computing device does not include the humming by the wearer, the singing by the wearer, or the whistling by the wearer.

2. The wearable computing device of claim 1, wherein the wearable computing device is implemented as part of or takes the form of a head-mountable device (HMD).

3. The wearable computing device of claim 1, wherein the one or more sensors comprise one or more of a proximity sensor, an image-capture device, a microphone, an accelerometer, a gyroscope, and a magnetometer.

4. The wearable computing device of claim 3, wherein the microphone includes a bone conduction microphone.

5. The wearable computing device of claim 1, wherein the one or more sensors include an accelerometer and a gyroscope, and wherein the sensor data includes an output from one or more of the accelerometer and the gyroscope indicative of a nodding head of the wearer.

6. The wearable computing device of claim 1, wherein the control system is further configured to:
provide for display information indicative of a song corresponding to the audio content in the ambient environment of the wearable computing device.

7. The wearable computing device of claim 6, wherein the information indicative of the song in the ambient environment of the wearable computing device includes one or more of a song title, a genre, an artist, and an album title.

8. The wearable computing device of claim 6, wherein the control system is further configured to:
provide for display an option to purchase the song corresponding to the audio content in the ambient environment of the wearable computing device.

9. The wearable computing device of claim 6, wherein the control system is further configured to:
provide for display an option to rate the song corresponding to the audio content in the ambient environment of the wearable computing device.

10. The wearable computing device of claim 1, wherein the control system is configured to initiate a song identification application on the wearable computing device to perform the content recognition of the audio content in the ambient environment of the wearable computing device.

11. The wearable computing device of claim 1, wherein the control system is further configured to:
provide for display a list of songs identified by the content recognition.

12. The wearable computing device of claim 1, wherein the control system is configured to perform the content recognition of the audio content in the ambient environment of the wearable computing device by:
recording a portion of audio content from the ambient environment; and
comparing the recorded portion of the audio content from the ambient environment to a database of songs.

13. The wearable computing device of claim 1, wherein the control system is further configured to:

provide for display an option to play a song corresponding to the audio content in the ambient environment of the wearable computing device.

14. A method comprising:
receiving sensor data from one or more sensors of a wearable computing device;
determining whether the sensor data is indicative of humming by a wearer, indicative of singing by the wearer, or indicative of whistling by the wearer for a given time period, wherein the humming, singing, or whistling varies over the given time period such that the humming, singing, or whistling corresponds to at least a portion of a song in an ambient environment of the wearable computing device; and
in response to the sensor data being indicative of humming by the wearer, indicative of singing by the wearer, or indicative of whistling by the wearer, causing the wearable computing device to perform a content recognition on audio content in the ambient environment of the wearable computing device, wherein the audio content in the ambient environment of the wearable computing device does not include the humming by the wearer, the singing by the wearer, or the whistling by the wearer.

15. The method of claim 14, wherein the method further comprises:
providing for display information indicative of a song corresponding to the audio content in the ambient environment of the wearable computing device, wherein the information indicative of the song includes one or more of a song title, a genre, an artist, and an album title.

16. The method of claim 14, wherein the wearable computing device is configured to initiate a song identification application on the wearable computing device to perform the content recognition of the audio content in the ambient environment of the wearable computing device.

17. The method of claim 14, wherein the wearable computing device is configured to perform the content recognition of the audio content in the ambient environment of the wearable computing device by:
recording a portion of audio content from the ambient environment; and
comparing the recorded portion of the audio content from the ambient environment to a database of songs.

18. The method of claim 14, wherein the method further comprises:
providing for display an option to play a song corresponding to the audio content in the ambient environment of the wearable computing device.

19. A non-transitory computer-readable medium storing instructions that, when executed by one or more processors of a head-mountable device, cause the head-mountable device to perform functions comprising:
receiving sensor data from one or more sensors of the head-mountable device;
determining whether the sensor data is indicative of humming by a wearer, indicative of singing by the wearer, or indicative of whistling by the wearer for a given time period, wherein the humming, singing, or whistling varies over the given time period such that the humming, singing, or whistling corresponds to at least a portion of a song in an ambient environment of the wearable computing device; and
in response to the sensor data being indicative of humming by the wearer, indicative of singing by the wearer, or indicative of whistling by the wearer, causing the wearable computing device to perform a content recognition on audio content in the ambient environment of the wearable computing device, wherein the audio content in the ambient environment of the wearable computing device does not include the humming by the wearer, the singing by the wearer, or the whistling by the wearer.

20. The non-transitory computer-readable medium of claim 19, wherein the functions further comprise:
providing for display information indicative of a song corresponding to the audio content in the ambient environment of the head-mountable device, wherein the information indicative of the song includes one or more of a song title, a genre, an artist, and an album title.

21. The non-transitory computer-readable medium of claim 19, wherein the functions further comprise:
providing for display a list of songs identified by the content recognition.

22. The non-transitory computer-readable medium of claim 19, wherein the head-mountable device is configured to perform the content recognition of the song in the ambient environment of the head-mountable device by:
recording a portion of audio content from the ambient environment; and
comparing the recorded portion of the audio content from the ambient environment to a database of songs.

23. The non-transitory computer-readable medium of claim 19, wherein the functions further comprise:
providing for display an option to play a song corresponding to the audio content in the ambient environment of the head-mountable device.

* * * * *